United States Patent
Liu et al.

(10) Patent No.: US 11,356,012 B2
(45) Date of Patent: Jun. 7, 2022

(54) TRANSMISSION AND DISTRIBUTION SYSTEM WITH ELECTRIC SHOCK PROTECTION FUNCTION AND METHOD OF OPERATING THE SAME

(71) Applicant: DELTA ELECTRONICS, INC., Taoyuan (TW)

(72) Inventors: Chien-Hung Liu, Taoyuan (TW); Yi-Hua Chang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 2 days.

(21) Appl. No.: 16/983,401

(22) Filed: Aug. 3, 2020

(65) Prior Publication Data

US 2021/0351690 A1    Nov. 11, 2021

(30) Foreign Application Priority Data

May 11, 2020  (CN) .......................... 202010393330.7

(51) Int. Cl.
| | |
|---|---|
| H02M 1/32 | (2007.01) |
| H02J 3/12 | (2006.01) |
| H02M 3/335 | (2006.01) |
| H02H 3/40 | (2006.01) |
| H02H 7/26 | (2006.01) |

(52) U.S. Cl.
CPC ............. H02M 1/32 (2013.01); H02H 3/40 (2013.01); H02H 7/261 (2013.01); H02J 3/12 (2013.01); H02M 3/33507 (2013.01)

(58) Field of Classification Search
CPC .... H02M 1/32; H02M 3/33507; H02H 7/261; H02H 3/40; H02J 3/12
See application file for complete search history.

(56) References Cited

U.S. PATENT DOCUMENTS

| | | | |
|---|---|---|---|
| 8,781,637 B2 | 7/2014 | Eaves | |
| 2010/0231407 A1* | 9/2010 | Carr | ......................... H04Q 9/00 340/691.1 |
| 2011/0085273 A1 | 4/2011 | Bengtsson et al. | |

(Continued)

FOREIGN PATENT DOCUMENTS

CN        102077433 A        5/2011

OTHER PUBLICATIONS

Taiwan office action dated Nov. 10, 2020 of Taiwan patent No. I737294.

*Primary Examiner* — Adolf D Berhane
*Assistant Examiner* — Afework S Demisse
(74) *Attorney, Agent, or Firm* — Muncy, Geissler, Olds & Lowe, P.C.

(57) ABSTRACT

A transmission and distribution system with electric shock protection function includes a transmitting terminal and a receiving terminal. The transmitting terminal includes a switch, a current measurer, a signal generator, and a controller. The receiving terminal includes a filter. The switch is coupled to a first DC power and a transmission line. The current measurer is coupled to the transmission line, and measures a current of the transmission line and provides a current signal. The signal generator provides a disturbance signal to the transmission line. The controller receives the current signal and controls the switch. If the controller determines that the current signal contains the disturbance signal, the controller turns off the switch.

16 Claims, 4 Drawing Sheets

(56) References Cited

U.S. PATENT DOCUMENTS

| | | | |
|---|---|---|---|
| 2012/0075759 A1* | 3/2012 | Eaves | H02H 3/40 361/86 |
| 2012/0161523 A1* | 6/2012 | Kim | H02J 13/0075 307/66 |
| 2016/0134105 A1* | 5/2016 | Harris | H02H 3/16 361/91.1 |

* cited by examiner

FIG.4

TRANSMISSION AND DISTRIBUTION SYSTEM WITH ELECTRIC SHOCK PROTECTION FUNCTION AND METHOD OF OPERATING THE SAME

BACKGROUND

Technical Field

The present disclosure relates to a transmission and distribution system, and more particularly to a transmission and distribution system with electric shock protection function and a method of operating the same.

Description of Related Art

The statements in this section merely provide background information related to the present disclosure and do not necessarily constitute prior art.

For supplying power to remote equipment by a base station, since the transmission distance from a transmitting terminal to a receiving terminal is typically far, an AC power is converted into a high-voltage DC voltage at the transmitting terminal, such as 190 volts, and then the high-voltage DC voltage is transmitted through a power transmission line to the receiving terminal, and finally the high-voltage DC voltage is stepped down to a low-voltage DC voltage, such as 48 volts for supplying power to DC loads. Due to the higher transmission voltage and the longer transmission distance, there may be a risk of electric shock caused by accidental touch of the human body or other living things. In the applications of remote transmission product, therefore, it is necessary to meet the requirements of ATIS-0600030, that is, the requirements of protection against electric shock of living things.

In general, if the position where the human body touches is between one end of a DC power and the ground, because part of the current passes through the ground and does not return to the DC power, the current transmitted out is not equal to the current returned. Therefore, the transmitting terminal can be aware that an abnormal grounding has occurred and then the power is thus interrupted. However, if the position where the human body touches is between the positive end and negative end of the DC power, the transmitting terminal fails to determine whether it is a normal load condition or an electric shock occurs when a person touches electricity.

Figure 1:
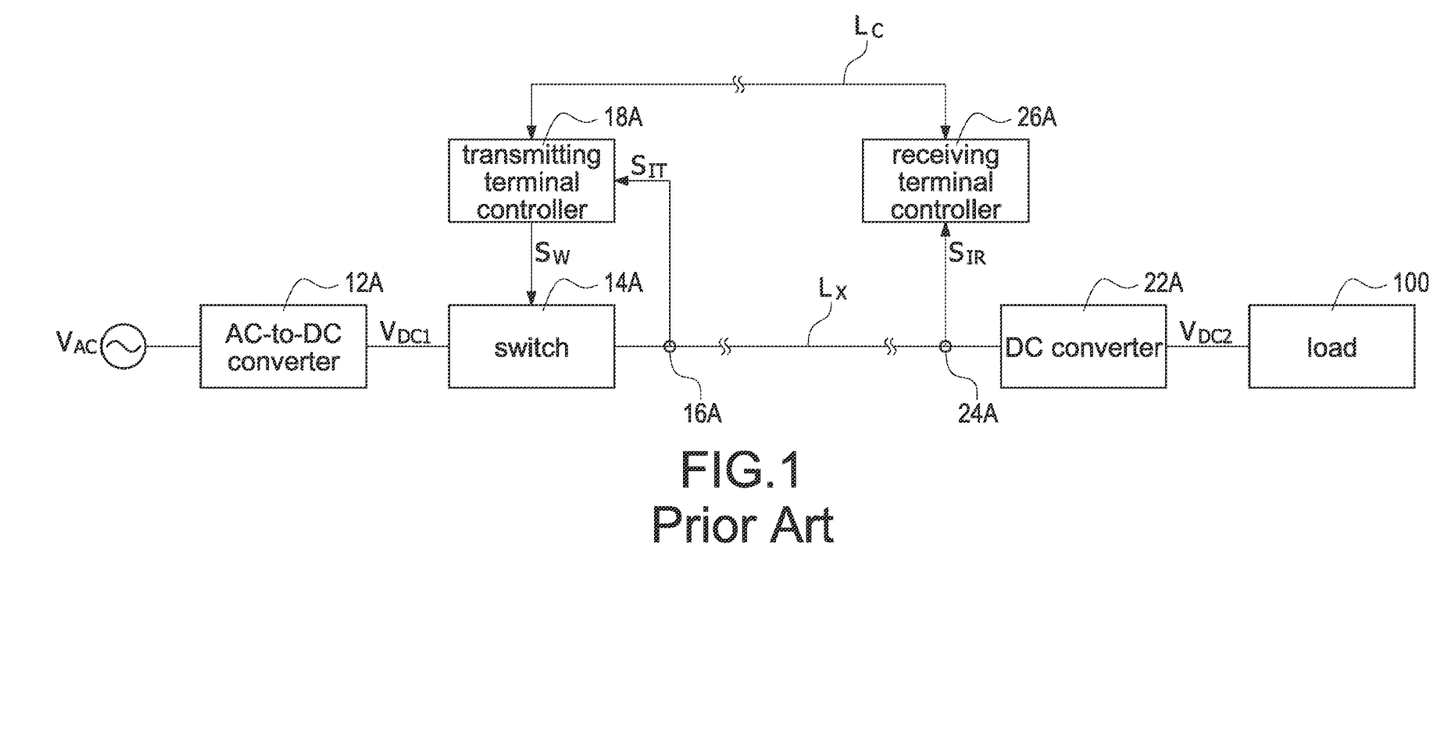
FIG. 1 is a system block diagram of a conventional transmission and distribution system for detecting an electric shock.

Please refer to FIG. 1, which shows a system block diagram of a conventional transmission and distribution system for detecting an electric shock. The transmission and distribution system has a transmitting terminal (side) and a receiving terminal (side). The receiving terminal receives the power transmitted from the transmitted terminal through a transmission line $L_X$, such as a power transmission line and supplies to a load 100. The transmitting terminal includes an AC-to-DC converter 12A, a switch 14A, a transmitting terminal current measurer 16A, and a transmitting terminal controller 18A. The receiving terminal includes a DC converter 22A, a receiving terminal current measurer 24A, and a receiving terminal controller 26A.

The AC-to-DC converter 12A is a step-up converter for converting an AC input power source $V_{AC}$ into a first DC power $V_{DC1}$. The first DC power $V_{DC1}$ is, for example but not limited to, a DC high voltage with 190 volts. The switch 14A is coupled to an output side of the AC-to-DC converter 12A and the transmission line $L_X$. The transmitting terminal current measurer 16A is coupled to the transmission line $L_X$ and the transmitting terminal controller 18A. The transmitting terminal current measurer 16A measures a magnitude of a current flowing through the transmission line $L_X$ at the transmitting terminal and provides a transmitting terminal current signal $S_{IT}$. The transmitting terminal controller 18A receives the transmitting terminal current signal $S_{IT}$ to realize the magnitude of the current flowing through the transmission line $L_X$ at the transmitting terminal, and provides a switch control signal $S_W$ to turn on or turn off the switch 14A, thereby controlling whether the power provided by the transmitting terminal is transmitted to the receiving terminal.

The DC converter 22A is a step-down converter for stepping down the first DC power $V_{DC1}$ to a second DC power $V_{DC2}$. The second DC power $V_{DC2}$ is, for example but not limited to, a DC low voltage with 48 volts. The receiving terminal current measurer 24A is coupled to the transmission line $L_X$ and the receiving terminal controller 26A. The receiving terminal current measurer 24A measures a magnitude of a current flowing through the transmission line $L_X$ at the receiving terminal and provides a receiving terminal current signal $S_{IR}$. The receiving terminal controller 26A receives the receiving terminal current signal $S_{IR}$ to realize the magnitude of the current flowing through the transmission line $L_X$ at the receiving terminal.

Further, a communication line $L_C$ is connected between the transmitting terminal controller 18A and the receiving terminal controller 26A to provide a bi-directional communication. Specifically, the transmitting terminal controller 18A can transmit the information of the magnitude of the current flowing through the transmission line $L_X$ at the transmitting terminal to the receiving terminal through the communication line $L_C$, or the receiving terminal controller 26A can transmit the information of the magnitude of the current flowing through the transmission line $L_X$ at the receiving terminal to the transmitting terminal through the communication line $L_C$. Therefore, the transmitting terminal controller 18A or the receiving terminal controller 26A can determine that a current difference between the transmitting terminal and the receiving terminal.

The aforementioned information transmission manner between the transmitting terminal and the receiving terminal though a network transmission, for example by the above-mentioned communication line $L_C$, is an existing command manner for detecting whether the electric shock occurs on the transmission line $L_X$ of the transmission and distribution system.

However, due to the typically long distance between the transmitting terminal and the receiving terminal, problems of setting up the communication line may occur if wired communication is used. Also, even with wireless communication, once the network interruption occurs, the network transmission power is insufficient, or no network is available, the communication line $L_C$ will fail and cannot be used as the communication medium between the transmitting terminal controller 18A and the receiving terminal controller 26A, and therefore the function of electric shock protection will not work, which may cause human life safety and property loss.

SUMMARY

An object of the present disclosure is to provide a transmission and distribution system with electric shock protection function to solve the above-mentioned problems.

In order to achieve the above-mentioned object, the transmission and distribution system with electric shock protection function includes a transmitting terminal and a receiving terminal. The transmitting terminal transmits a first DC power to the receiving terminal through a transmission line. The transmitting terminal includes a switch, a current measurer, a signal generator, and a controller. The switch is coupled to the first DC power and the transmission line. The current measurer is coupled to the transmission line, and measures a current of the transmission line and provides a current signal. The signal generator provides a disturbance signal to the transmission line. The controller receives the current signal and controls the switch accordingly. The receiving terminal includes a filter. The filter is coupled to the transmission line. If the controller determines that the current signal contains the disturbance signal, the controller turns off the switch.

In one embodiment, the disturbance signal is carried on the first DC power.

In one embodiment, the disturbance signal is a high-frequency voltage signal.

In one embodiment, the disturbance signal has at least one frequency.

In one embodiment, when a resistance is between a positive end and a negative end of the transmission line, the current signal contains the disturbance signal.

In one embodiment, the controller has a high-pass filter, and the high-pass filter is configured to filter and extract the high-frequency voltage signal.

In one embodiment, the current measurer is a Hall sensor.

In one embodiment, the controller performs a Fast Fourier Transform on the current signal to analyze the disturbance signal.

In one embodiment, the receiving terminal further includes a DC converter. The DC converter is coupled to the filter, and steps down the first DC power to a second DC power.

In one embodiment, the DC converter is a switch mode power supply, and a maximum switching frequency of the switch mode power supply is less than a frequency of the disturbance signal.

In one embodiment, if the current measurer does not measure the disturbance signal, the controller turns on the switch.

Accordingly, the transmission and distribution system with electric shock protection function is provided to detect whether a person touches electricity, and once the condition that a person touches electricity is detected, the transmission of the power to the receiving terminal will be interrupted, and therefore the electric shock can be immediately eliminated to achieve the electric shock protection function.

Another object of the present disclosure is to provide a method of operating a transmission and distribution system with electric shock protection function to solve the above-mentioned problems.

In order to achieve the above-mentioned object, the method of operating the transmission and distribution system with electric shock protection function includes steps of: transmitting a first DC power from a transmitting terminal to a receiving terminal through a transmission line, providing a disturbance signal to the transmission line, measuring a current of the transmission line and providing a current signal, and interrupting the first DC power to the receiving terminal if determining that the current signal contains the disturbance signal.

In one embodiment, the disturbance signal is carried on the first DC power.

In one embodiment, the disturbance signal is a high-frequency voltage signal and has at least one frequency.

In one embodiment, when a resistance is between a positive end and a negative end of the transmission line, the current signal contains the disturbance signal.

In one embodiment, a Fast Fourier Transform is performed on the current signal to analyze the disturbance signal.

Accordingly, the method of operating the transmission and distribution system with electric shock protection function is provided to detect whether a person touches electricity, and once an electric shock occurs when a person touches electricity, the transmission of the power to the receiving terminal will be interrupted, and therefore the electric shock can be immediately eliminated to achieve the electric shock protection function.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Reference will now be made to the drawing figures to describe the present disclosure in detail. It will be understood that the drawing figures and exemplified embodiments of present disclosure are not limited to the details thereof.

Figure 2:
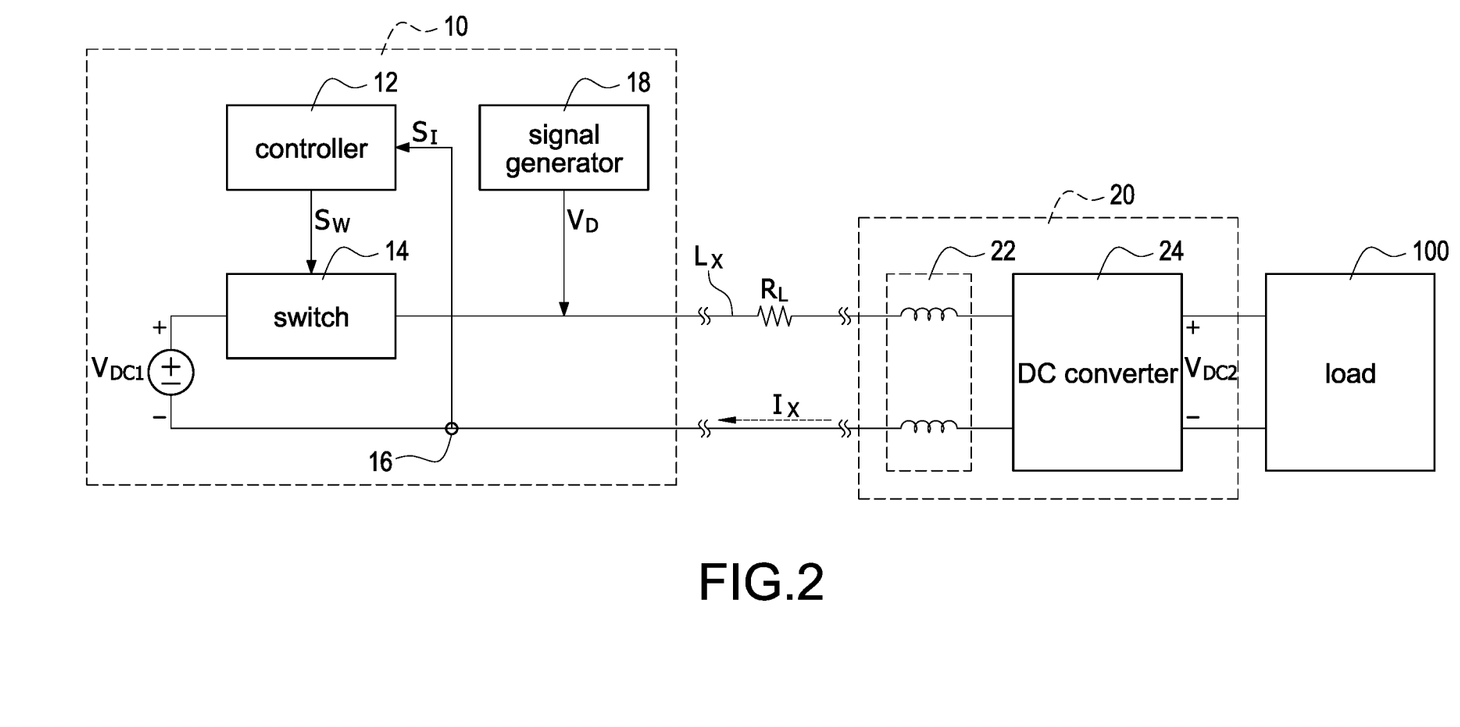
FIG. 2 is a block diagram of a transmission and distribution system with electric shock protection function according to the present disclosure.

Please refer to FIG. 2, which shows a block diagram of a transmission and distribution system with electric shock protection function according to the present disclosure. The transmission and distribution system with electric shock protection function includes a transmitting terminal 10 and a receiving terminal 20. The transmitting terminal 10 and the receiving terminal 20 are typically far apart, even up to several kilometers. The transmitting terminal 10 transmits a first DC power $V_{DC1}$ to the receiving terminal 20 through a transmission line $L_X$, and the transmission line $L_X$ has an equivalent line resistance $R_L$. In particular, the first DC power $V_{DC1}$ may be provided by converting an AC power source (not shown) by an AC-to-DC converter (not shown), but it is not to limit the present disclosure. In other embodiments, the first DC power $V_{DC1}$ may be provided by converting a DC power source (not shown) by a DC-to-DC converter (not shown). The first DC power $V_{DC1}$ is, for example but not limited to, a DC high voltage with 190 volts.

The transmitting terminal 10 includes a switch 14, a current measurer 16, a signal generator 18, and a controller 12. The switch 14 is coupled to the first DC power $V_{DC1}$ and the transmission line $L_X$. In particular, the switch 14 is, for example but not limited to, a mechanical switch or a power transistor switch. The current measurer 16 is coupled to the transmission line $L_X$ for measuring a current value of a current $I_X$ of the transmission line $L_X$, and provides a current signal $S_I$. In particular, the current measurer 16 is not limited to be disposed at a positive end or a negative end of the first DC power $V_{DC1}$, i.e., the measurement position thereof is not limited to at the positive end or the negative end of the first DC power $V_{DC1}$. The current measurer 16 is, for example but not limited to, a Hall sensor or a Rogowski coil. In this embodiment, the current value of the current $I_X$ is a magnitude of a current flowing from the receiving terminal 20 to the transmitting terminal 10.

The signal generator 108 provides a disturbance signal $V_D$ to the transmission line $L_X$. In particular, the disturbance signal $V_D$ and the first DC power $V_{DC1}$ are in a superimposed relationship, that is, the disturbance signal $V_D$ is carried on the first DC power $V_{DC1}$. In comparison with a magnitude of the first DC power $V_{DC1}$ (190 volts), the disturbance signal $V_D$ is, for example but not limited to, 5 volts. In this embodiment, the disturbance signal $V_D$ is a high-frequency voltage signal, for example but not limited to, with 500 kHz. Alternatively, the disturbance signal $V_D$ is a signal composed of more than two frequencies, and the appropriate disturbance frequency can be selected according to an equivalent resistance model of the human body or other organisms. The controller 12 receives the current signal $S_I$ and provides a control signal $S_W$ to turn on or turn off the switch 14. It can be seen in the following detailed description.

The receiving terminal 20 includes a filter 22 and a DC converter 24. The filter 22 is coupled to the transmission line $L_X$, and the filter 22 is, for example but not limited to, an inductor or an EMI filter. The DC converter 24 is coupled to the filter 22 for stepping down the first DC power $V_{DC1}$ to a second DC power $V_{DC2}$ to supply power to a load 100. The second DC power $V_{DC2}$ is, for example but not limited to, 48-volt DC voltage. In particular, the transmitting terminal 10 shown in FIG. 2 is not limited to a stand-alone module, i.e., it can be integrated in the AC-to-DC converter or the DC-to-DC converter depending on whether the input power source is AC or DC. Further, the DC converter 24 and the filter 22 shown in FIG. 2 can be integrated in the same module or separated.

Hereinafter, the operation principle of the transmission and distribution system with electric shock protection function of the present disclosure will be described. As shown in FIG. 2, a power transmitted from the transmitting terminal 10 to the receiving terminal 20 is equal to the first DC power $V_{DC1}$ plus the disturbance signal $V_D$ (i.e., $V_{DC1}+V_D$). When no person touches electricity, the power of the first DC power $V_{DC1}$ plus the disturbance signal $V_D$ is transmitted to the receiving terminal 20. However, the high-frequency disturbance signal $V_D$ is filtered out by the filter 22 so that the remaining first DC power $V_{DC1}$ is transmitted to the DC converter 24 through the filter 22. By the DC converter 24, the first DC power $V_{DC1}$ is stepped down to the second DC power $V_{DC2}$ with 48 volts for supplying power to the load 100, such as a DC load.

In this condition, because of the presence of the filter 22, the high-frequency disturbance signal $V_D$ fails to form a corresponding current in the loop, and therefore the current value of the current $I_X$ measured by the current measurer 16 does not significantly contain a high-frequency current component caused by the disturbance signal $V_D$. Therefore, when the current measurer 16 measures the current value of the current $I_X$ and provides the current signal $S_I$ to the controller 12, the controller 12 can calculate the current signal $S_I$ through, for example but not limited to, the Fast Fourier Transform to analyze the high-frequency component of the disturbance signal $V_D$. In this embodiment, since the current value of the current $I_X$ flowing from the receiving terminal 20 to the transmitting terminal 10 does not significantly contain a high-frequency current component caused by the disturbance signal $V_D$, no high-frequency component of the disturbance signal $V_D$ is analyzed from the current signal $S_I$ through the Fast Fourier Transform by the controller 12. Therefore, the controller 12 provides the control signal $S_W$ to turn on the switch 14 so that the first DC power $V_{DC1}$ can be normally and continuously transmitted to the receiving terminal 20 to supply power to the load 100.

In another embodiment, a ripple value of the current value of the current $I_X$ can be measured by the current measurer 16, for example, a current sensor with induction coils may be used to measure a variation degree of the current, and then the current measurer 16 provides the current signal $S_I$ to the controller 12. The controller 12 sets a ripple threshold, and if the controller 12 determines that the ripple value of the current signal $S_I$ is less than the ripple threshold, the controller 12 provides the control signal $S_W$ to turn on the switch 14 so that the first DC power $V_{DC1}$ can be normally and continuously transmitted to the receiving terminal 20 to supply power to the load 100.

Figure 3:
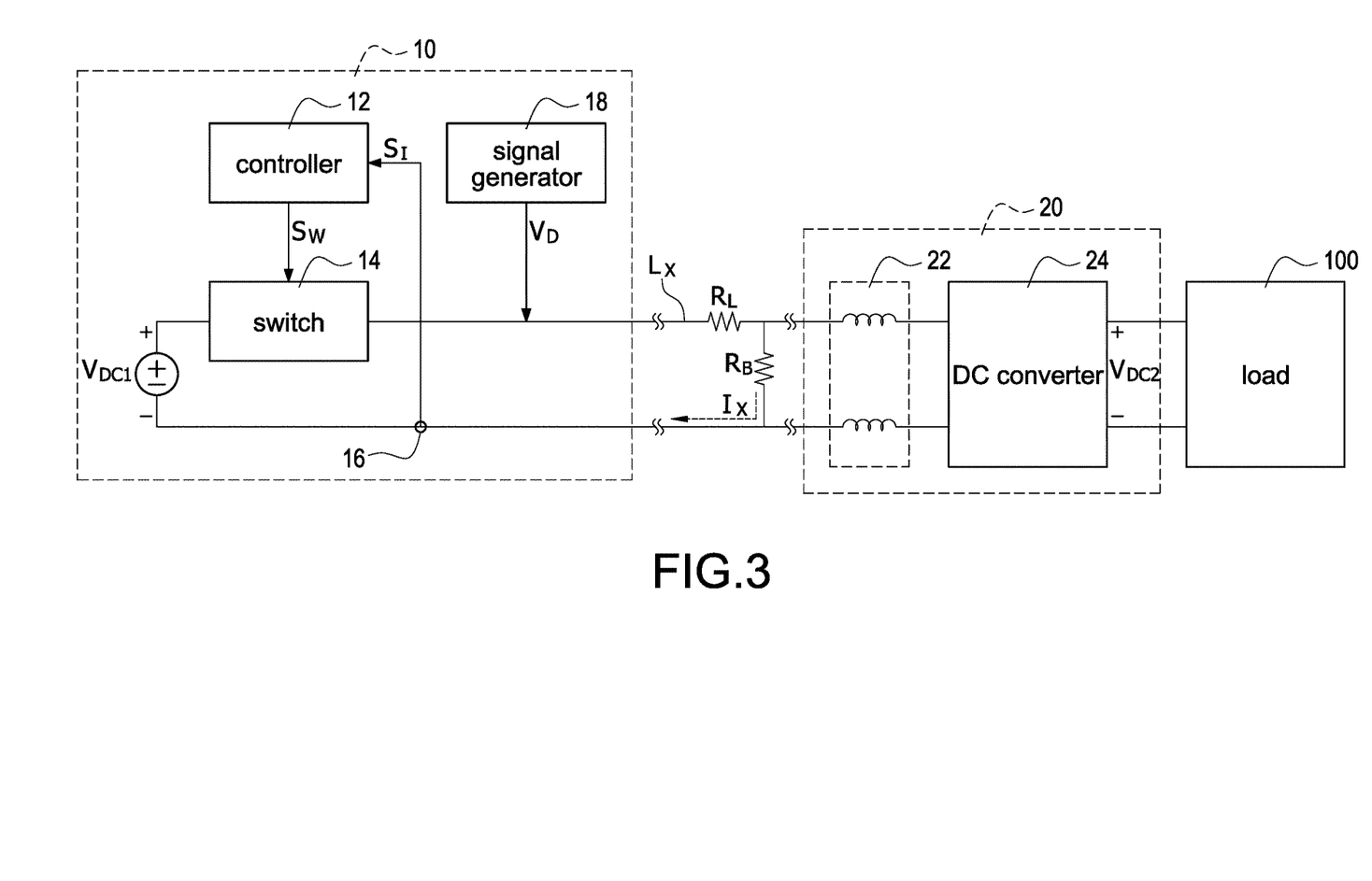
FIG. 3 is a schematic diagram of the transmission and distribution system with electric shock protection function that a person touches electricity according to the present disclosure.

Please refer to FIG. 3, which shows a schematic diagram of the transmission and distribution system with electric shock protection function that a person touches electricity according to the present disclosure. A power transmitted from the transmitting terminal 10 to the receiving terminal 20 is equal to the first DC power $V_{DC1}$ plus the disturbance signal $V_D$ (i.e., $V_{DC1}+V_D$). When a person touches electricity, the human body equivalently provides a resistance $R_B$ between the negative end and the negative end of the transmission line $L_X$, i.e., a simple resistance is to represent the body resistance. Since the disturbance signal $V_D$ with the high-frequency component does not pass through the filter 22 and the human body does not have a filtering mechanism, the current value of the current $I_X$ flowing through a loop formed by the resistance $R_B$ to the transmitting terminal 10 contains the disturbance signal $V_D$ with the high-frequency component. In this condition, the current measurer 16 measures the current value of the current $I_X$ and provides the current signal $S_I$ to the controller 12. At this time, the ripple value of the current signal $S_I$ will also become larger so that the controller 12 can determine that the ripple value has exceeded the ripple threshold, or the controller 12 calculates the current signal $S_I$ through the Fast Fourier Transform to analyze the high-frequency component of the disturbance signal $V_D$.

Since the controller 12 can determine the high-frequency component of the disturbance signal $V_D$ once an electric shock occurs when a person touches electricity, the controller 12 provides the control signal $S_W$ to turn off the switch 14 so as to interrupt the transmission of the first DC power $V_{DC1}$ to the receiving terminal 20. Therefore, the electric shock can be immediately eliminated to achieve the electric shock protection function.

In particular, the DC converter 24 converts the first DC power $V_{DC1}$ to a voltage that is required by the load 200. In one embodiment, the DC converter 24 may be a linear regulator or a switch mode power supply (SMPS). If the switch mode power supply is used, no matter whether the switching frequency of the switches of the switch mode power supply is with variable frequency control or fixed frequency control, the current will have a component of the switching frequency. Therefore, the frequency selection of the disturbance signal $V_D$ must be able to be distinguished from the switching frequency of the switches so as to avoid false detection. For example, if the maximum switching frequency of the switches of the DC converter 24 is close to 100 kHz, the frequency of the disturbance signal $V_D$ can be selected as, for example but not limited to, 500 kHz greater than 100 kHz, that is, the frequency selection of the disturbance signal $V_D$ is preferably greater than the maximum switching frequency of the DC converter 24. In particular, the closer the two frequencies are, the more complicated the design of the controller is. Through proper selection of the frequency of the disturbance signal $V_D$, the controller 12 can filter and extract the specific frequency of the current signal $S_I$ (for example, the frequency of the disturbance signal $V_D$) with a simple high-pass filter, and determine whether the specific frequency exceeds a frequency threshold. Alternatively, the controller 12 can calculate the current signal $S_I$ through, for example but not limited to, the Fast Fourier Transform to analyze the high-frequency component of the disturbance signal $V_D$.

Figure 4:
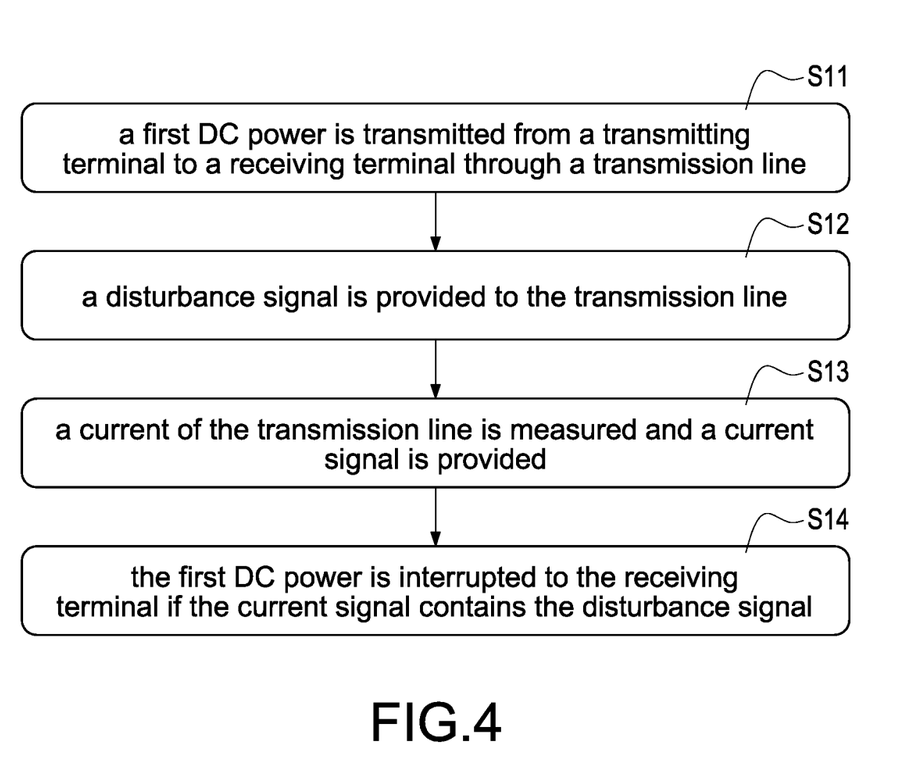
FIG. 4 is a flowchart of a method of operating the transmission and distribution system with electric shock protection function according to the present disclosure.

Please refer to FIG. 4, which shows a flowchart of a method of operating the transmission and distribution system with electric shock protection function according to the present disclosure. The transmission and distribution system with electric shock protection function includes a transmitting terminal and a receiving terminal. The transmitting terminal is connected to the receiving terminal through a transmission line. The method includes following steps. First, a first DC power is transmitted from the transmitting terminal to the receiving terminal through the transmission line (S11). The first DC power may be provided by converting an AC power source by an AC-to-DC converter, or by converting a DC power source by a DC-to-DC converter.

Afterward, a disturbance signal is provided to the transmission line (S12). The disturbance signal is generated by a signal generator. The disturbance signal and the first DC power are in a superimposed relationship, that is, the disturbance signal is carried on the first DC power. The disturbance signal is a high-frequency voltage signal, for example but not limited to, with 500 kHz. Alternatively, the disturbance signal is a signal composed of more than two frequencies, and the appropriate disturbance frequency can be selected according to an equivalent resistance model of the human body or other organisms.

Afterward, a current of the transmission line is measured and a current signal is provided (S13). A current measurer coupled to the transmission line is used to measure a magnitude of a current flowing through the transmission line and provides the current signal according to the magnitude of the current.

Finally, the first DC power transmitted to the receiving terminal is interrupted when the current signal contains the disturbance signal (S14). When no person touches electricity, the power of the first DC power plus the disturbance signal is transmitted to the receiving terminal. However, the high-frequency disturbance signal is filtered out by a filter coupled to the transmission line so that the remaining first DC power is transmitted to the receiving terminal through the filter. In this condition, because of the presence of the filter, the high-frequency disturbance signal fails to form a corresponding current in the loop, and therefore the current value measured by the current measurer does not significantly contain a high frequency current component caused by the disturbance signal. Therefore, when the current measurer measures the current value and provides the current signal to a controller, the controller can calculate the current signal through, for example but not limited to, the Fast Fourier Transform to analyze the high-frequency component of the disturbance signal. Since the current value of the current flowing from the receiving terminal to the transmitting terminal does not significantly contain a high-frequency current component caused by the disturbance signal, the controller provides a control signal to turn on the switch coupled to the transmission line so that the first DC power can be normally and continuously transmitted to the receiving terminal to supply power to the load. In another embodiment, a ripple value of the current value can be measured by the current measurer, for example, a current sensor with induction coils may be used to measure a variation degree of the current, and then the current measurer provides the current signal to the controller. The controller sets a ripple threshold, and if the controller determines that the ripple value of the current signal is less than the ripple threshold, the controller provides the control signal to turn on the switch so that the first DC power can be normally and continuously transmitted to the receiving terminal to supply power to the load.

When a person touches electricity, the human body equivalently provides a resistance between the positive end and the negative end of the transmission line. Since the disturbance signal with the high-frequency component does not pass through the filter and the human body does not have a filtering mechanism, the current value of the current flowing through a loop formed by the resistance to the transmitting terminal contains the disturbance signal with the high-frequency component. In this condition, the current measurer measures the current value and provides the current signal to the controller. At this time, the ripple value of the current signal will also become larger so that the controller can determine that the ripple value has exceeded the ripple threshold, or the controller calculates the current signal through the Fast Fourier Transform to analyze the high-frequency component of the disturbance signal. Since the controller can determine the high-frequency component of the disturbance signal once an electric shock occurs when a person touches electricity, the controller provides the control signal to turn off the switch so as to interrupt the transmission of the first DC power to the receiving terminal. Therefore, the electric shock can be immediately eliminated to achieve the electric shock protection function.

In Conclusion, the Present Disclosure has Following Features and Advantages:

1. By providing the disturbance signal and carrying it on the power, the determination of whether a person touches electricity can be simply achieved.

2. Once an electric shock occurs when a person touches electricity, the transmission of the power to the receiving terminal can be interrupted so that the electric shock can be immediately eliminated to achieve the electric shock protection function.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A transmission and distribution system with electric shock protection function, comprising a transmitting terminal and a receiving terminal, wherein the transmitting terminal transmits a first DC power to the receiving terminal through a transmission line, the transmitting terminal comprising:
   a switch coupled to the first DC power and the transmission line;
   a current measurer coupled to the transmission line, and configured to measure a current of the transmission line and provide a current signal;
   a signal generator configured to provide a disturbance signal to the transmission line, wherein a voltage magnitude of the disturbance signal is less than a voltage magnitude of the first DC power; and
   a controller configured to receive the current signal and control the switch accordingly,
   wherein the receiving terminal comprises a filter coupled to the transmission line, and
   wherein the controller is configured to turn off the switch if the controller determines that the current signal contains the disturbance signal.

2. The transmission and distribution system with electric shock protection function in claim 1, wherein the disturbance signal is carried on the first DC power.

3. The transmission and distribution system with electric shock protection function in claim 1, wherein the disturbance signal is a high-frequency voltage signal.

4. The transmission and distribution system with electric shock protection function in claim 1, wherein the disturbance signal has at least one frequency.

5. The transmission and distribution system with electric shock protection function in claim 1, wherein when a resistance is between a positive end and a negative end of the transmission line, the current signal contains the disturbance signal.

6. The transmission and distribution system with electric shock protection function in claim 3, wherein the controller has a high-pass filter, and the high-pass filter is configured to filter and extract the high-frequency voltage signal.

7. The transmission and distribution system with electric shock protection function in claim 1, wherein the current measurer is a Hall sensor.

8. The transmission and distribution system with electric shock protection function in claim 1, wherein the controller is configured to perform a Fast Fourier Transform on the current signal to analyze the disturbance signal.

9. The transmission and distribution system with electric shock protection function in claim 1, wherein the receiving terminal further comprises:
   a DC converter coupled to the filter, and configured to step down the first DC power to a second DC power.

10. The transmission and distribution system with electric shock protection function in claim 9, wherein the DC converter is a switch mode power supply, and a maximum switching frequency of the switch mode power supply is less than a frequency of the disturbance signal.

11. The transmission and distribution system with electric shock protection function in claim 1, wherein if the current measurer does not measure the disturbance signal, the controller turns on the switch.

12. A method of operating a transmission and distribution system with electric shock protection function, comprising steps of:
   transmitting a first DC power from a transmitting terminal to a receiving terminal through a transmission line;
   providing a disturbance signal to the transmission line, wherein a voltage magnitude of the disturbance signal is less than a voltage magnitude of the first DC power;
   measuring a current of the transmission line and providing a current signal; and
   interrupting the first DC power to the receiving terminal if determining that the current signal contains the disturbance signal.

13. The method of operating the transmission and distribution system with electric shock protection function in claim 12, wherein the disturbance signal is carried on the first DC power.

14. The method of operating the transmission and distribution system with electric shock protection function in claim 12, wherein the disturbance signal is a high-frequency voltage signal and has at least one frequency.

15. The method of operating the transmission and distribution system with electric shock protection function in claim 12, wherein when a resistance is between a positive end and a negative end of the transmission line, the current signal contains the disturbance signal.

16. The method of operating the transmission and distribution system with electric shock protection function in claim 12, wherein a Fast Fourier Transform is performed on the current signal to analyze the disturbance signal.

* * * * *